May 18, 1926.
A. A. SHELTON
JAW TRAP PEDAL PROTECTOR
Filed April 9, 1925
1,585,425
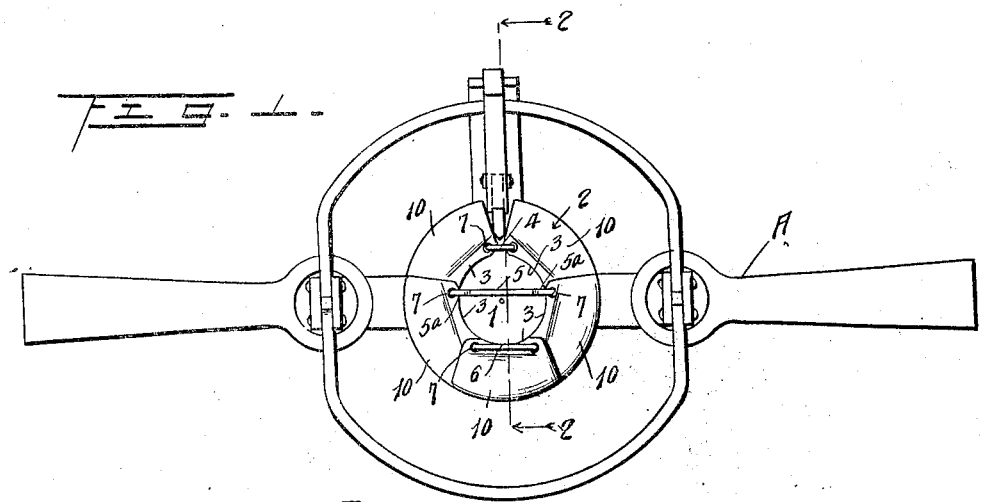
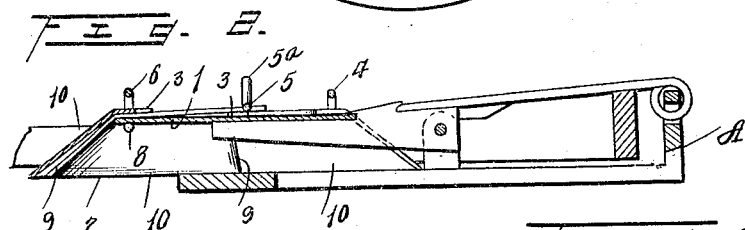
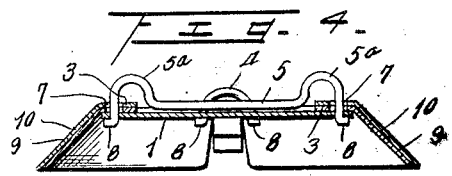
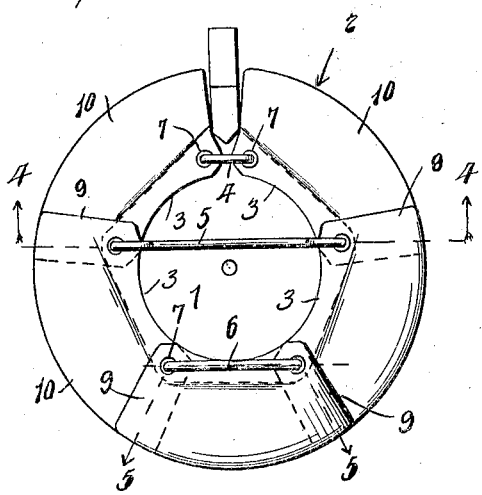
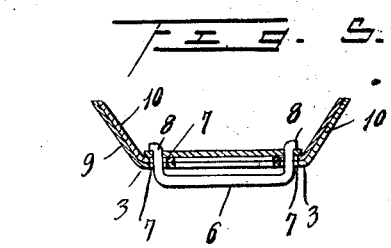
Inventor
A. A. Shelton, Patented May 18, 1926.

1,585,425

UNITED STATES PATENT OFFICE.

ALEXANDER A. SHELTON, OF HACKBERRY, ARIZONA.

JAW-TRAP-PEDAL PROTECTOR.

Application filed April 9, 1925. Serial No. 21,927.

The invention relates to jaw traps.

In traps of the jaw type, commonly called field traps, a trigger pedal is employed to spring the trap. As the operation of the trap would be interfered with should foreign matter get under the pedal, the invention of this application has for its object the provision of means by which foreign matter, such as dirt, trash, etc., will be excluded and the efficiency of the trap will be improved.

The construction and operation and advantages of the invention will be described in detail hereinafter and will be found illustrated in the accompanying drawings, in which—

Figure 1 is a top plan view of a jaw trap showing the protector in position thereon, Figure 2 a cross section on a plane indicated by the line 2—2 of Figure 1, Figure 3 a plan view on an enlarged scale of the trigger pedal and protector, Figure 4 a sectional view on the plane indicated by the line 4—4 of Figure 3, and Figure 5 a similar view on the line 5—5 of Figure 3, the parts being shown inverted and the U-shaped pivoting member shown in elevation.

In the drawings similar reference characters will be used to designate corresponding parts in the several views.

A jaw trap of conventional type is indicated at A and has a trigger pedal 1 having its edges formed by a plurality of straight edges. The protector comprises a plurality of plates 2, angular in cross section and having one of the sides of each plate overlapping the trigger plate 1 as shown at 3 and pivotally secured thereto by means of U-shaped members 4, 5, and 6, said U-shaped members engaging through holes 7 in the part 3 of plates 2. The ends of the U-shaped members 4, 5, and 6 are clinched to the trigger plate 1 as shown at 8.

The adjacent edges of the plates 2 are overlapped as shown at 9, and the outer edges of the plates, 10, are deflected downwardly.

U-shaped member 5 is formed with a loop 5ª at each end thereof, while members 4 and 6 are spaced above the plates 2, this structure permitting movement of the individual plates relatively to the trigger pedal to permit actuation of the pedal in springing the trap. The downwardly deflected portions 10 by enclosing the space under the trigger pedal 1 will effectually prevent any dirt or trash being deposited under the pedal to interfere with the operation thereof.

What is claimed is:—

1. In combination with the trigger pedal of a jaw trap, a protector therefor comprising plates pivotally secured thereto.

2. In combination with the trigger pedal of a jaw trap, a protector therefor comprising plates pivotally secured thereto and having the portions thereof outside of the edges of the trigger pedal downwardly deflected.

3. In combination with the trigger pedal of a jaw trap, a protector therefor comprising plates pivotally secured thereto and having their adjacent edges overlapping one another.

4. In combination with the trigger pedal of a jaw trap, a protector therefor comprising plates pivotally secured thereto and having the portions thereof outside of the edges of the pedal downwardly deflected, the adjacent edges of said plates overlapping one another.

5. In combination with a trigger pedal of a jaw trap having a plurality of straight edges, a protector therefor comprising a plate pivotally mounted adjacent to each said straight edge and having the outer portions thereof downwardly deflected, the adjacent edges of said plates being overlapped.

6. In combination with a trigger pedal of a jaw trap having a plurality of straight edges, a protector therefor comprising angular plates pivotally secured to the trigger pedal through one of its angular sides, the other side of each plate extending downwardly from the trigger pedal, and the adjacent edges of said angular plates being overlapped.

In testimony whereof I affix my signature.

ALEXANDER A. SHELTON.